June 22, 1926.
J. E. SEEBOLD
1,589,436
PROTECTED PHOTOGRAPHING DEVICE
Filed May 9, 1925
3 Sheets—Sheet 1
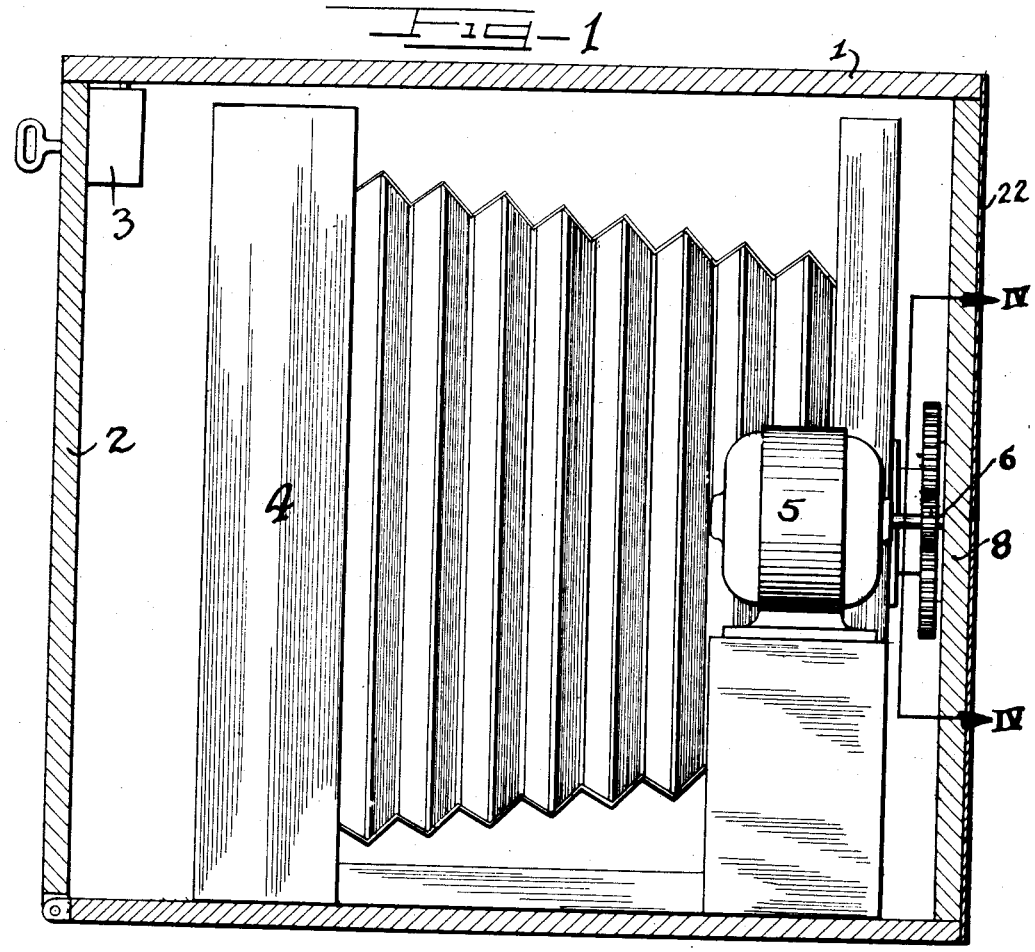
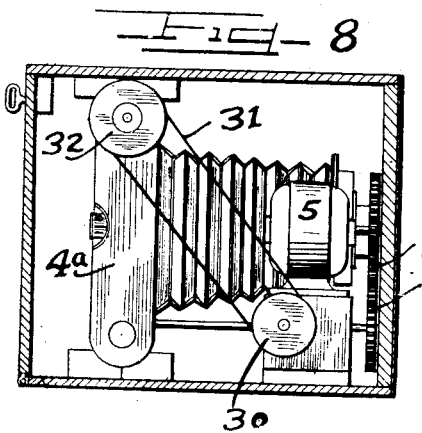
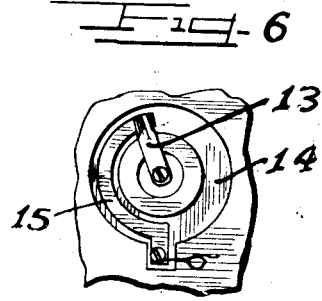
INVENTOR
John Ellsworth Seebold.
by
ATTYS.

June 22, 1926.
J. E. SEEBOLD
1,589,436
PROTECTED PHOTOGRAPHING DEVICE
Filed May 9, 1925        3 Sheets-Sheet 2
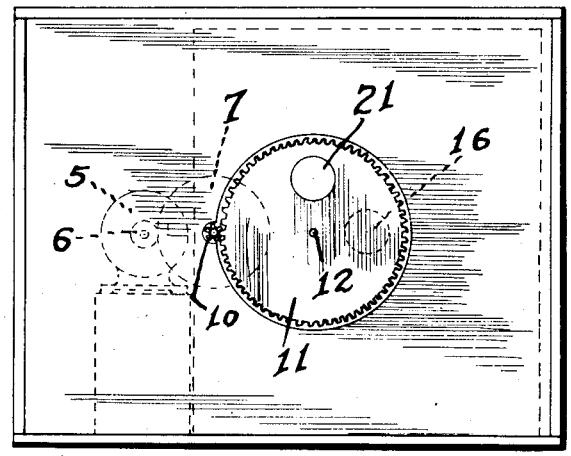
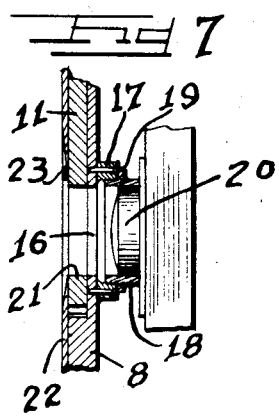
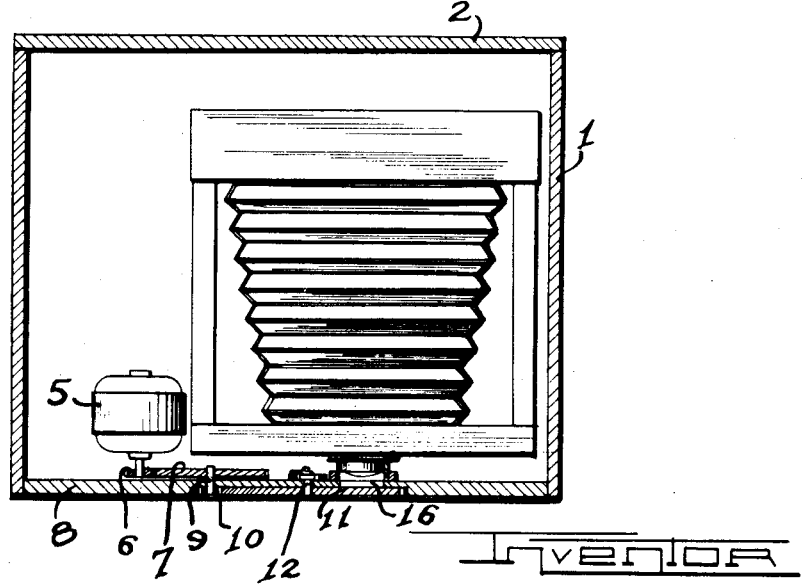
Inventor
John Ellsworth Seebold.
by Charles Hill
Attys.

June 22, 1926.
J. E. SEEBOLD
1,589,436
PROTECTED PHOTOGRAPHING DEVICE
Filed May 9, 1925   3 Sheets-Sheet 3
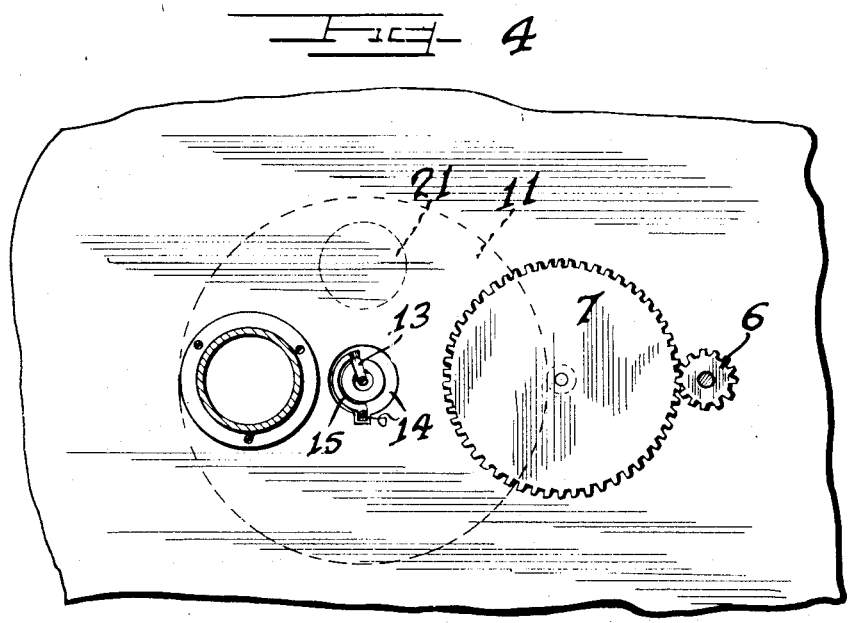
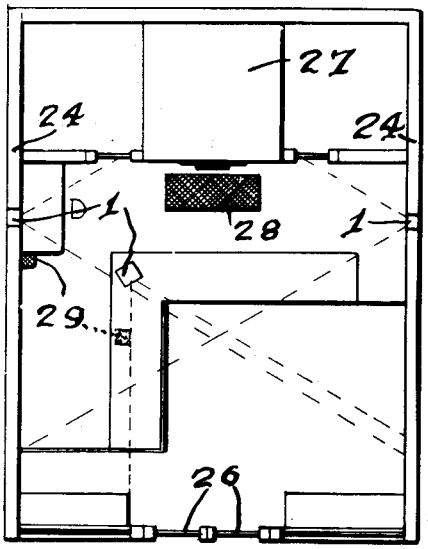
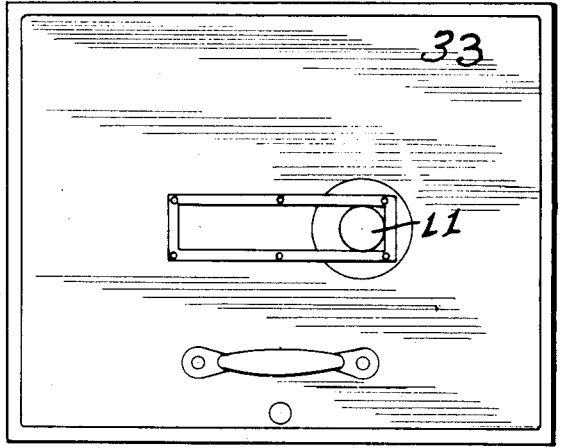
Inventor
John Ellsworth Seebold
by Charles van Hall Attys.

Patented June 22, 1926.

1,589,436

UNITED STATES PATENT OFFICE.

JOHN ELLSWORTH SEEBOLD, OF LA SALLE, ILLINOIS.

PROTECTED PHOTOGRAPHING DEVICE.

Application filed May 9, 1925. Serial No. 29,023.

This invention relates to photographic devices in general and more particularly to such devices as are adapted to photograph unwelcomed intruders, such as robbers and burglars. Heretofore it has been difficult to determine the description of a robber or burglar, even in such cases in which witnesses have been available. The reason for this has been not only because the testimony of the witnesses is invariably conflicting, but also because the cameras which might be used to automatically photograph the intruder have not been adequately protected.

It is accordingly an object of this invention to provide a means for photographing which is fully protected from destruction.

It is also an object of this invention to provide an armored housing for a camera and a shutter cooperating therewith which immediately after the photographing takes place, closes and protects the plate in said camera from destruction by means of gun fire or by the insertion of any instrument.

With the above and other objects in view, as will be apparent, this invention consists in the construction, combination and arrangement of parts, all as hereinafter more fully described, claimed and illustrated in the accompanying drawings.

On the drawings:

Figure 1 represents a vertical side view, partly in section, of a device embodying this invention.

Figure 2 represents a vertical front view with parts removed of the same.

Figure 3 is a plan view partly in section of the same.

Figure 4 is a detail rear elevational view at the line IV—IV of Figure 1.

Figure 5 is a diagrammatic view showing an application of the device.

Figure 6 is a detail elevational view.

Figure 7 is a detail view partly in section.

Figure 8 represents a modification of this invention.

Figure 9 represents a view in elevation of a modification of this invention.

As shown on the drawings:

In reference to Figure 1 numeral 1 represents an armored housing, preferably of one-fourth inch steel, having a hinged rear door 2 and a lock 3 on said door by means of which the housing may be secured in closed position. Suitably supported in the housing 1 is a camera 4. Also supported in the housing 1 is an electric motor 5 adjacent the forward end of the camera 4. Secured on the armature shaft of the motor 5 is a pinion 6 which is adapted to engage with a gear 7 rotatably mounted on the forward plate 8 of the housing 1. The gear 7 is rigidly mounted upon a shaft 9 which extends into a recess in the forward side of the plate 8. Within the recess in the forward side of the plate 8 is mounted a pinion 10 which is driven by the shaft 9. The forward side of the plate 8 is additionally recessed to receive a large gear 11 which is rigidly mounted upon a rotatable shaft 12. The shaft 12 extends through the plate 8 at the rear end thereof and has rigidly secured thereon an arm 13. Surrounding the shaft 12 on the rear side of the plate 8 is an insulating member 14 which has secured thereon an arcuate contact member 15. The contact member 15 is adapted to be engaged by the arm 13 throughout a portion of the rotation thereof. The plate 8 is apertured as at 16. As shown in Figure 7 there is provided around the aperture 16 in the plate 8 a ring 17 which is rigidly secured to the plate 8. A cylindrical member 18 threadedly engages in the ring 17 and is additionally secured thereto by a locking ring 19. The cylindrical member 18 is adapted to receive therein the forward end of the lens housing 20 of the camera 4. The gear or shutter 11 is apertured as at 21, said aperture being adapted when the shutter is in a selected position to align with the aperture 16 for causing exposure of the film in the camera 4. Outside of the plate 8 there is provided a thin plate 22 which as shown more particularly in Figure 7 is also apertured, the aperture thereof being in alignment with the aperture 16. The edges 23 of the aperture in the plate 22 are bevelled so that when the shutter 11 is in closed position the presence of said aperture will not be apparent. As shown in Figure 5 the device would probably be used in an arrangement somewhat as shown in said figure. The housings 1 are shown installed in the walls 24 of a bank. One of the housings 1 is mounted above the inner side of the cashier's and teller's desk 25. Numerals 26 represent the entrances to the bank. The dotted lines represent the arc covered by the respective devices in the housings 1. A safe 27 has outside thereof a matting 28. Mattings 29 may also be provided. Underneath the mattings 28 and 29 are provided switches (not shown) which are adapted to be actuated when the matting is stepped on. The switches underneath the mattings 28 and 29 are connected in parallel with each other and are so connected that when any one of them is closed by some one stepping upon any of the mattings, an electric circuit including the motor 5, the contact member 15 and the arm 13 will be energized, providing the arm 13 is in contacting position upon the arcuate member 15. When the circuit is thus energized, the motor will by means of the intermediate gears 6, 7 and 10 rotate the shutter 11, bringing the aperture 21 therein in register with the aperture 16, thus exposing the film in the camera 4. As soon as the shutter 11 has rotated a predetermined amount, the arm 13 rotatable therewith will ride off the contact member 15 thus breaking the circuit and stopping the motor. The shutter 11 being of sufficient thickness to be bullet proof will protect the camera from injury from without. In the use of this invention there would also be provided an automatic flash light arrangement which would be automatically set off when the aperture 21 of the shutter came in register with the aperture 16 to expose the film. As shown in Figure 8 the device may have included therewith suitable gearing for making more than one exposure. In said Figure 8 is shown a gear 29 driven by the gear 7 which transmits rotative movement to a pulley 30 which is connected by means of a belt 31 to a pulley 32 mounted upon the film roller shaft of the camera 4ª. In this case the gear 29 and intermediate gearing between the same and pulley 30 would be such that one rotation of the shutter 11 was sufficient to roll up one film. In this modification, of course, the members 13, 14 and 15 would be eliminated. It is obvious that a motion picture camera could also be used without exceeding the scope of this invention.

There are numerous ways in which the housing 1 may be camouflaged. As shown in Figure 9 the housing 1 is mounted in a filing cabinet 33.

It will be seen that I have provided an efficient device for obtaining photographic records of robbers or burglars. It will also be obvious that by means of my arrangement the robber or burglar will be unable to determine where the camera is which took his picture and even if he should find it, he will be unable to destroy it within a reasonable length of time due to the protection provided therefor.

By insulating this device, say with asbestos or other suitable composition, this machine can be used for the purpose of making scientific research experiments where the photographing of hot metals is desired as the machine will remain cool thereby protecting the lens and camera, plates or films from breaking or catching on fire.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a device of the class described, an armored casing having an opening therein, a revoluble bullet-proof closure therefor having an opening therein, a shutterless camera within said casing alined with said first opening and means including an electric circuit and motor for revolving said closure upon the closing of said circuit to effect a registration of said openings for taking a picture.

2. In a device of the class described, an armored casing having an opening therein, a shutterless camera within said casing alined with said opening, a bullet-proof shutter for normally closing said opening and means for actuating said shutter to open and close said opening.

3. In a device of the class described, an armored casing having an opening therein, a shutterless camera within said casing alined with said opening, a bullet-proof shutter for normally closing said opening and means including an electrical circuit and motor connected therein for actuating said shutter to open and close said opening.

4. In a device of the class described, an armored casing having an opening therein, said casing being recessed adjacent said opening, a bullet-proof shutter rotatably mounted in said recess flush with the surface of said casing, a picture taking device mounted within said casing and alined with said opening and means for operating said shutter to take a picture.

5. In a device of the class described, an armored casing having an opening therein, an orificed closure member therefor rotatably mounted on said casing and having circumferential teeth, a motor gear connected to said toothed closure member, an electrical circuit adapted to energize said motor to operate said closure through a limited fractional revolution during which registration of said orifice with said opening is temporarily effected and picture taking means within said casing in alinement with said opening and adapted to take a picture therethrough.

In testimony whereof I have hereunto subscribed my name.

JOHN ELLSWORTH SEEBOLD.